United States Patent [19]

Hasegawa

[11] Patent Number: 4,667,251

[45] Date of Patent: May 19, 1987

[54] METHOD AND APPARATUS FOR ENCODING AND TRANSMITTING PICTURE INFORMATION OF HALF TONES

[75] Inventor: Akira Hasegawa, Tokyo, Japan

[73] Assignee: Kabushiki Kaisha Toshiba, Kawasaki, Japan

[21] Appl. No.: 728,275

[22] Filed: Apr. 29, 1985

[30] Foreign Application Priority Data

Apr. 27, 1984 [JP] Japan ................... 59-85644

[51] Int. Cl.⁴ .............................................. H04N 1/40
[52] U.S. Cl. ..................................... 358/283; 358/261
[58] Field of Search ............... 358/261, 283, 280, 260, 358/298; 382/56

[56] References Cited

U.S. PATENT DOCUMENTS

| | | | |
|---|---|---|---|
| 3,185,823 | 5/1965 | Ellersick, Jr. et al. | 358/261 X |
| 3,185,824 | 5/1965 | Blaslag et al. | 358/261 X |
| 3,213,268 | 10/1965 | Ellersick, Jr. | 358/261 X |
| 3,502,806 | 3/1970 | Townsend | 358/261 |
| 3,808,362 | 4/1974 | Tsuda et al. | 358/261 |
| 3,967,052 | 6/1976 | Judice | 358/261 X |
| 4,475,127 | 10/1984 | Sinuma | 358/283 |
| 4,533,957 | 8/1985 | Sinuma | 358/283 |

FOREIGN PATENT DOCUMENTS

140070 8/1982 Japan .

Primary Examiner—Edward L. Coles, Sr.
Attorney, Agent, or Firm—Finnegan, Henderson, Farabow, Garrett & Dunner

[57] ABSTRACT

A half tone picture information is encoded and transmitted by apparatus comprising dither processing means for dither processing an analog picture image signal into a picture information block including M picture element points × N scanning points by means of a dither matrix including M × N threshold values, correlating processing means for correlating respective picture elements between dither processed picture information blocks by the dither matrix for outputting signal change information of respective picture elements between respective picture information blocks, an encoding means for encoding the signal change information outputted from the signal processing means.

26 Claims, 11 Drawing Figures

METHOD AND APPARATUS FOR ENCODING AND TRANSMITTING PICTURE INFORMATION OF HALF TONES

BACKGROUND OF THE INVENTION

This invention relates to an improvement of a method and apparatus for suppressing redundancy and encoding picture information of half tones and then transmitting the encoded information, and more particularly a method and apparatus for transmitting encoded picture information binarized by a dither method.

In recent years, the dither method has been frequenty used for converting an analog picture signal containing picture information of a half tones into a binary code. According to this method, at the time of binarizing an analog signal containing a half tone component, a binarizing judging threshold value is varied by using a random function or a quasi random function for generating bright spots of a number corresponding to a local average value of an input picture signal. For example, a picture image is converted into a block at each M picture element points×N scanning points (M and N are positive integers) and different binarizing judging levels are assigned for respective picture elements of each block so as to binarize the analog picture signal according to the binarizing judging levels, whereby bright spots are systematically arranged in the picture element space, thus reproducing the half tone of the picture image.

Generally, for the purpose of decreasing the quantity of information, when transmitting a picture image, the binarized picture signal is encoded with its redundancy being suppressed. A picture signal binarized by the dither method has also been encoded and then transmitted with Modified Huffman (MH) or Modified Read (MR) or Modified Modified Read ($M^2R$) based on CCITT T-6 encoding systems, for example.

However, a picture signal binarized by the dither method generally contains a large member of black and white variations. Therefore, when a binarized picture signal is encoded as it is with the MH, MR or $M^2R$ encoding system, the quantity of information to be transmitted becomes enormous, thus requiring a long transmission time.

SUMMARY OF THE INVENTION

Accordingly, it is an object of this invention to provide a novel method and apparatus for encoding and transmitting a picture image information of a half tone capable of decreasing white and black variation of a binarized picture information formed by the dither method so as to decrease the quantity of the information after suppressing the redundancy and then encoding thereby decreasing the transmission time.

According to one aspect of this invention, there is provided an encoding and transmitting apparatus of a half tone picture information comprising dither processing means for dither processing an analog picture image signal into a picture information block including M picture element points×N scanning points (where M and N are positive integers) with a dither matrix utilizing MXN threshold values; a correlation processing means for correlating respective picture elements between picture information blocks dither processed by the dither matrix to output signal change information of respective picture elements between respective picture information blocks; and encoding means for encoding the signal change information outputted from the signal processing means.

According to a modification of this invention, there is provided encoding and transmitting apparatus of a half tone picture information comprising: dither processing means for dither processing an analog picture image signal into a picture information block including M picture element points×N scanning points with a dither matrix utilizing M×N threshold values; first correlation processing means for correlating respective picture elements between respective picture information blocks dither processed by the dither matrix to output signal change information of respective picture elements between respective picture information blocks; encoding means for encoding the signal change information outputted from the first correlation processing means; the dither processing means, first correlation processing means and encoding means being installed on a transmission side; and decoding means for decoding the signal encoded by the encoding means; and second correlation processing means correlating respective information of the signal decoded by the decoding means between respective signal change information blocks corresponding the M picture element points×N scanning points thereby reproducing the picture information dither processed by the dither matrix, the decoding means and the second correlating means being installed on a receiving side.

According to another aspect of this invention, there is provided a method of encoding and transmitting a half tone image information comprising the steps of: dither processing an analog picture signal into a M picture elements×N scanning point picture information blocks with a dither matrix utilizing M×N threshold values; correlating respective picture elements between respective picture information blocks dither processed by the dither matrix to output signal change information of respective picture elements regarding respective picture information blocks; and encoding the signal change information.

DESCRIPTION OF THE PREFERRED EMBODIMENTS

Figure 1:
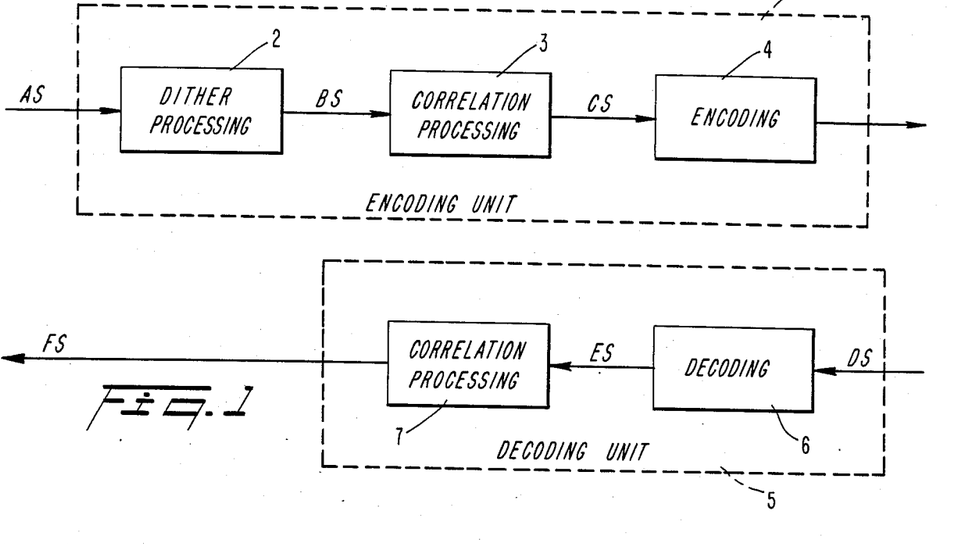
FIG. 1 is a block diagram showing one embodiment of an encoding and transmitting apparatus of an image information of a half tone according to this invention.

A preferred embodiment of this invention shown in FIG. 1 comprises an encoder unit which comprises a dither processing circuit 2 which processes an analog picture signal AS from a reading unit, not shown, with a dither matrix comprising M picture element points ×N scanning lines, a correlation processing circuit 3 applying a predetermined correlation processing to a binary signal BS outputted from the dither processing circuit 2 and an encoder circuit 4 which encodes a binary signal CS outputted from the correlation processing circuit 3 and encoded with an MH, MR or $M^2H$ encoding system. The output of the encoding circuit 4 is supplied to a modulator not shown for transmission.

Figure 2:
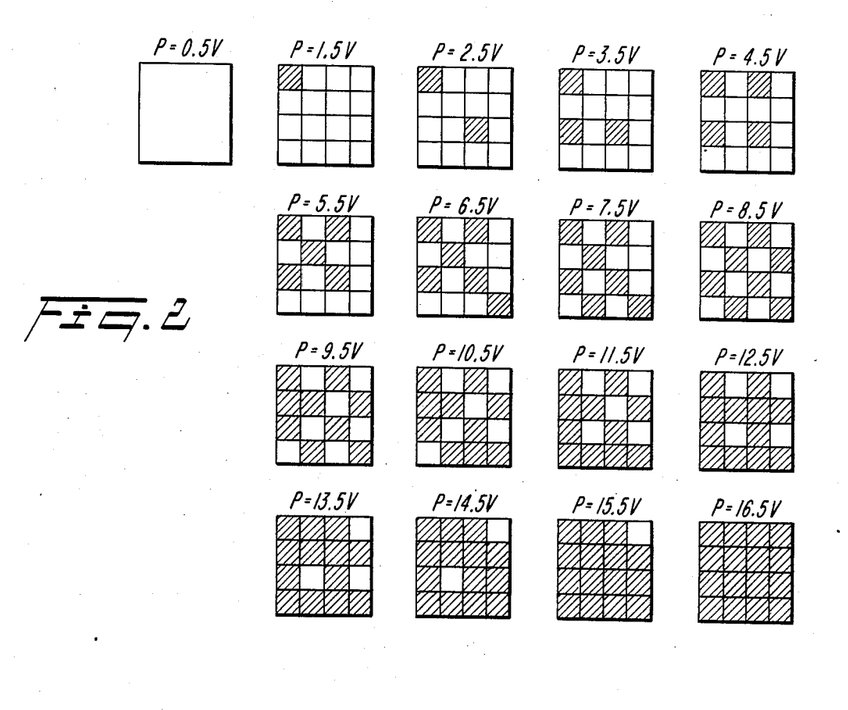
FIG. 2 shows patterns representing one example of a dither processing according to a dither matrix.

FIG. 2 shows one example of the dither processing by the circuit 2. More particularly, FIG. 2 shows one example of the patterns respectively representing cases wherein all picture elements have concentrations of 0.5 V through 16.5 V in a block comprising 4×4 picture elements.

A decoding unit 5 comprises a decoding circuit 6 decoding an encoded signal DS from a demodulator, not shown, with a decoding system corresponding to an encoding system utilized on the transmission side, and a correlation processing circuit 7 which reproduces a binary signal FS identical to the binary signal BS prior to subjecting signal BS to the correlation processing effected on the transmission side, the correlation processing circuit 7 on the receiving side processing a binary signal ES outputted from the decoding circuit 6.

Figure 3:
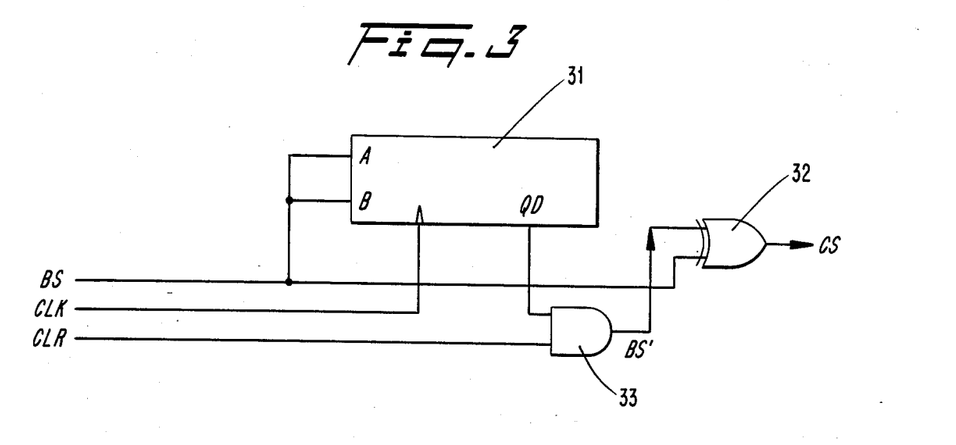
FIG. 3 is a connection diagram showing one construction of the correlation processing circuit on the transmission side shown in FIG. 1.

As shown in FIG. 3, the correlation processing circuit 3 of the encoding unit 1 comprises a serial input-parallel output type shift register 31, an exclusive OR gate circuit 32, and an AND gate circuit 33. The binary signal BS from the dither processing circuit 2 is supplied to one input terminal of the exclusive OR gate circuit 32 and to the shift register 31 so as to supply a picture element signal shifted by the shift register 31 corresponding to the number M (an integer larger than Z) of the picture image of the dither matrix to the other input of the exclusive OR gate circuit 32 via an AND gate circuit 33. The output of the exclusive OR gate circuit 32 acts as a binary signal after the correlation processing. The gate of the AND gate circuit 33 is controlled by a clear signal CLR at a "L" level.

Figure 4:
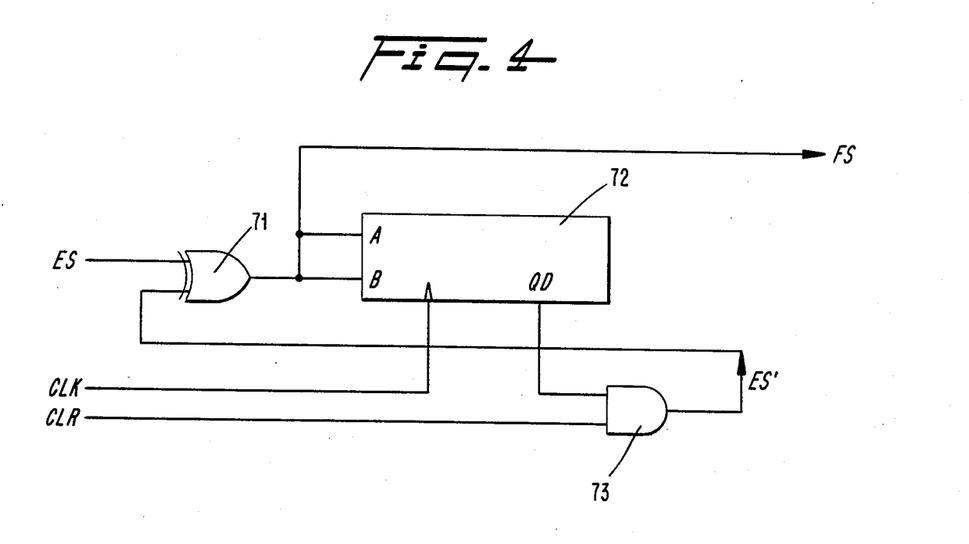
FIG. 4 is a connection diagram showing one construction of the correlation processing circuit on the receiving side shown in FIG. 1.

As shown in FIG. 4, the correlation processing circuit 7 of the decoding unit 5 comprises an exclusive OR gate circuit 71, a serial input-parallel output type shift register 72 and an AND gate circuit 73. The binary signal ES from the decoding circuit 6 is supplied to one input terminal of the exclusive OR gate circuit 71 and the output of the exclusive OR gate circuit 71 is used as a reproduced binary signal FS following the processing, the output being also applied to the shift register 72 which shifts the reproduced binary signal FS corresponding to the number M of the picture elements of the dither matrix and then outputs the sifted signal from its output terminal $Q_D$. The correlation processing circuit 7 supplies the output signal of the shift register 72 to the other input terminal of the exclusive OR gate circuit 71 via the AND gate circuit 73, the gate thereof being controlled by a clear signal at a "L" level. In FIGS. 3 and 4, CLK represent a shift clock pulse for the shift registers 31 and 72.

The operation of the encoding and transmitting system of this invention will now be described. It is assumed that the dither processing circuit 2 performs the dither processing with a dither matrix of 4×4 picture elements as shown in FIG. 2. Accordingly, the shift registers 31 and 72 of respective correlation processing circuit 3 and 7 are designed to delay shifted input picture element by 4 picture elements corresponding to the dither matrix and then output the delayed picture elements.

Figure 5:
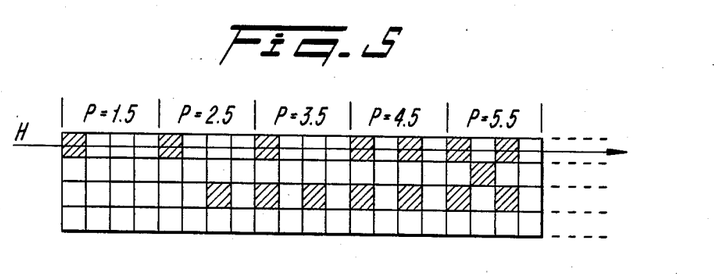
FIG. 5 shows a pattern useful to explain the operations of the correlation circuits on the transmission and receiving sides shown in FIGS. 3 and 4.
Figure 6:
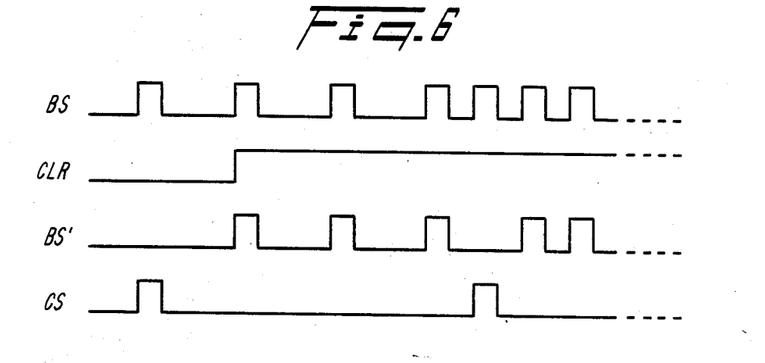
FIG. 6 is a timing chart for explaining the operation of the correlation processing circuit on the transmission side shown in FIG. 3.

Assuming now that the dither processing circuit 2 outputs the binary signal BS corresponding to a scanning line H of the dither pattern as shown in FIG. 5, for example, and that the binary signal BS is supplied to the correlation processing circuit 3, the exclusive OR gate circuit 32 operates to obtain a logic sum of this binary signal BS (see BS signal line of FIG. 6) with signal BS outputted from the shift register 31 after being delayed by 4 picture elements (signal BS' in FIGS. 3 and 6) for each picture element. At this time, to the AND gate circuit 33 is applied a clear signal CLR which is at a L level for the first four picture elements and becomes a H level at and after the 5th picture element as shown in CLR signal line of FIG. 6. Consequently, the exclusive OR gate circuit 32 outputs first a binary signal BS of the first picture element as it is and at and after the fifth picture element, a signal (signal change information) CS obtained by correlating via logic gate circuits 32 and 33 the binary signal BS after the fifth picture element and a binary signal BS' delayed by 4 picture element by the shift register 31. Thus, a binary signal CS with a small number of changes is supplied to the encoding circuit, thereby decreasing the information quantity of the encoded data.

Figure 7:
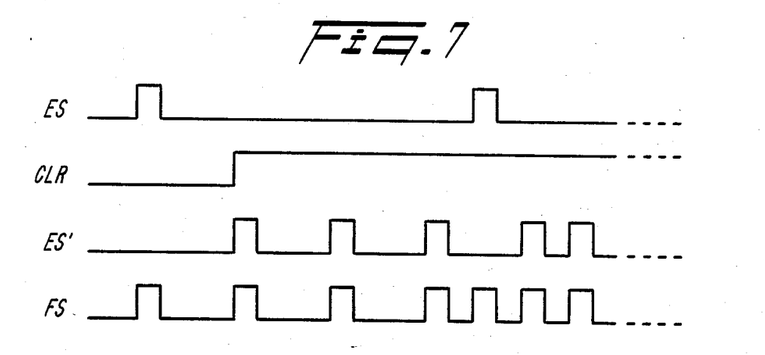
FIG. 7 is a timing chart for explaining the operation of the correlation processing circuit on the receiving side shown in FIG. 4.

When the binary signal ES decoded by the decoding circuit 6 is applied to the correlation processing circuit 7, an exclusive logic sum of this signal ES and the output signal ES' of the shift register 71 supplied via the AND gate circuit 73 is operated by the exclusive OR gate circuit 71. At this time, the clear signal CLR for first 4 picture elements becomes the L level while that for the fifth and the following picture elements becomes the H level. Consequently, the exclusive OR gate circuit produces the binary signal ES as it is up to the first four picture elements but thereafter outputs the exclusive logical sum FS of the binarized signal ES and the output signal ES' of the shift register 72, as shown in FIG. 7. In other words, a binary signal BS which has been subjected to the correlation processing on the transmission side to become signal CS and then subjected to a reverse correlation processing, to become signal FS that is a binary signal BS before subjecting to the correlation processing on the transmission side, would be reproduced as signal FS on the receiving side.

As above described, according to this embodiment, the characteristic of the binary signal formed by the dither matrix in which picture element levels of adjacent dither pattern are similar with each other is utilized so as to correlate picture elements at corresponding positions of adjacent dither pattern. By doing so even binary signals binarized by the dither method in which white and black generally vary greatly can be converted into signals with a small number of changes with the result that when these binary signals are encoded, their information quantity can be reduced greatly. Accordingly, it is possible to decrease the time required for transmission. Moreover, since each of the correlation circuits 3 and 7 can be readily constructed by using only a shift register, an exclusive OR gate circuit and an AND gate circuit, the apparatus is not complicated and bulky.

Figure 8:
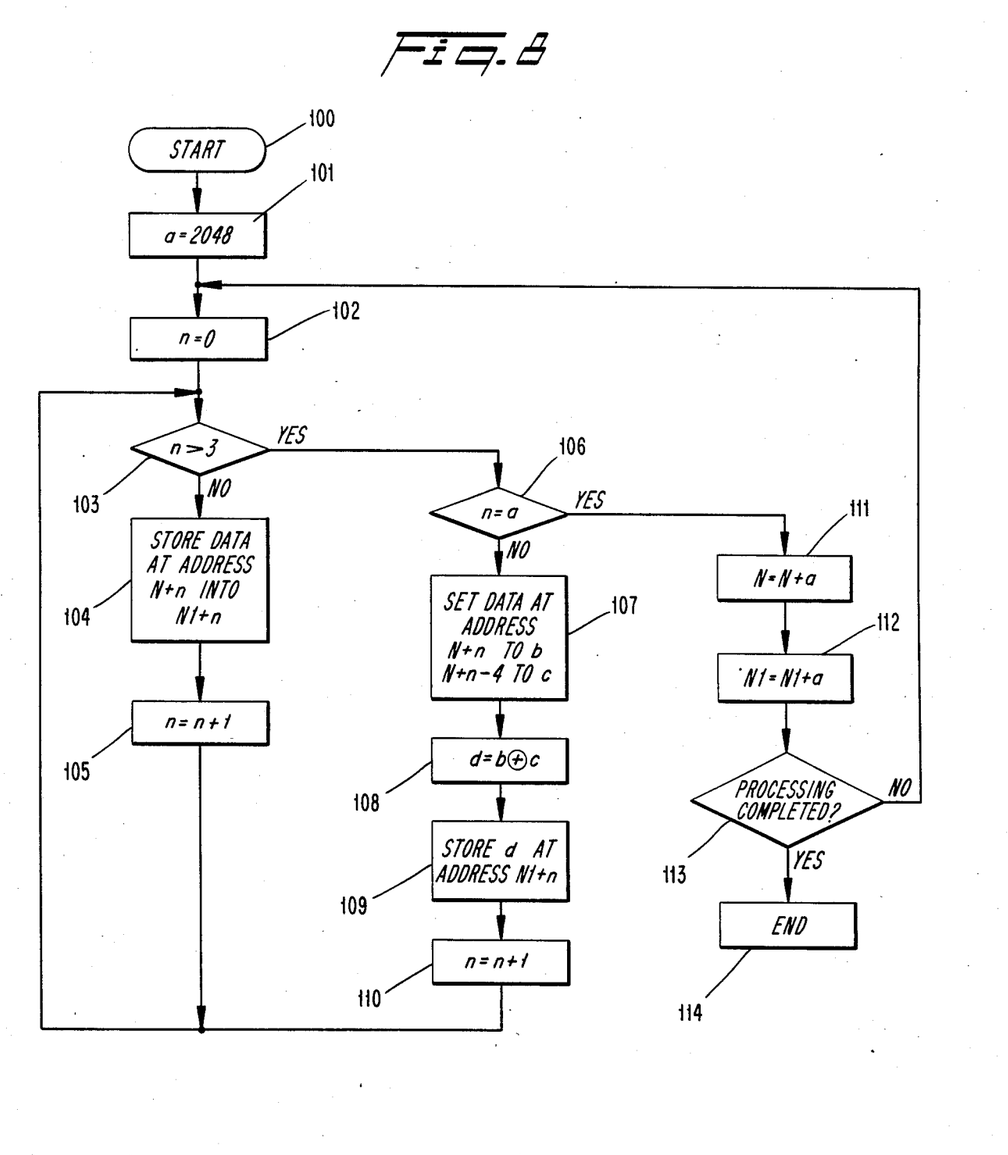
FIG. 8 is a flow chart showing another construction of the correlation processing circuit on the transmission side shown in FIG. 3.

FIG. 8 is a flow chart showing the operation of another example of the correlation processing circuit on the transmission side shown in FIG. 3. In this case, on the transmission side, the correlation processing is executed according to the flow chart shown in FIG. 8. According to the flow chart, the contents at respective addresses of an input buffer memory device, not shown, are subjected to suitable arithmetical operations, and results of these operations are stored in corresponding addresses in an output buffer memory device, not shown, thereby executing the correlation processing. The input buffer memory device is set to begin with an address N, whereas the output buffer memory device is set to begin with an address N1. Respective addresses of the input and output buffer memory devices correspond to the bits of respective picture elements.

In FIG. 8, at step 100, the correlation processing is started, and at step 101, a data a=2048 is set, 2048 representing the number of picture elements on one row of a sheet of paper having a size of Series B, No. 4 (Japanese standard). In this embodiment, an example is shown of encoding and transmitting the half tone picture information on a manuscript of a size of the Series B, No. 4. Then at step 2, a data n=0 is set, where n represents a picture element of the nth bit of each line, with n taking a value up to 2048. After that at step 103, a judgment is made as to whether n>3 or not. At the starting point, in the four bits of 0-3, since n<3, the result of judgment at step 103 would be No and the processing is advanced to step 104 in which the data of the (N+n)th address of the input buffer memory device are stored in the (N1+1)th address of the output buffer memory device. At step 105, n is incremented by one and the processing is returned to step 103. When the result of judgment at step 103 is n>3, the processing is branched to step 106 where a judgment is made as to whether n=a or not. When the result of judgment is NO, that is the given line is not finished, at step 107 the data (N+n)th address stored in the input memory device is changed to b, while the data (N+n−4)th address (the data four picture elements before the (N+n)th address) is set to c. After that at step 108, the exclusive logic summ of data b and c is determined and the sum is arithmetically operated as data d, which is stored in the (N1+1)th address of the output buffer memory device at step 109. Then at step 110, n is incremented by one. Thereafter, the processing is returned to step 103.

Figure 9:
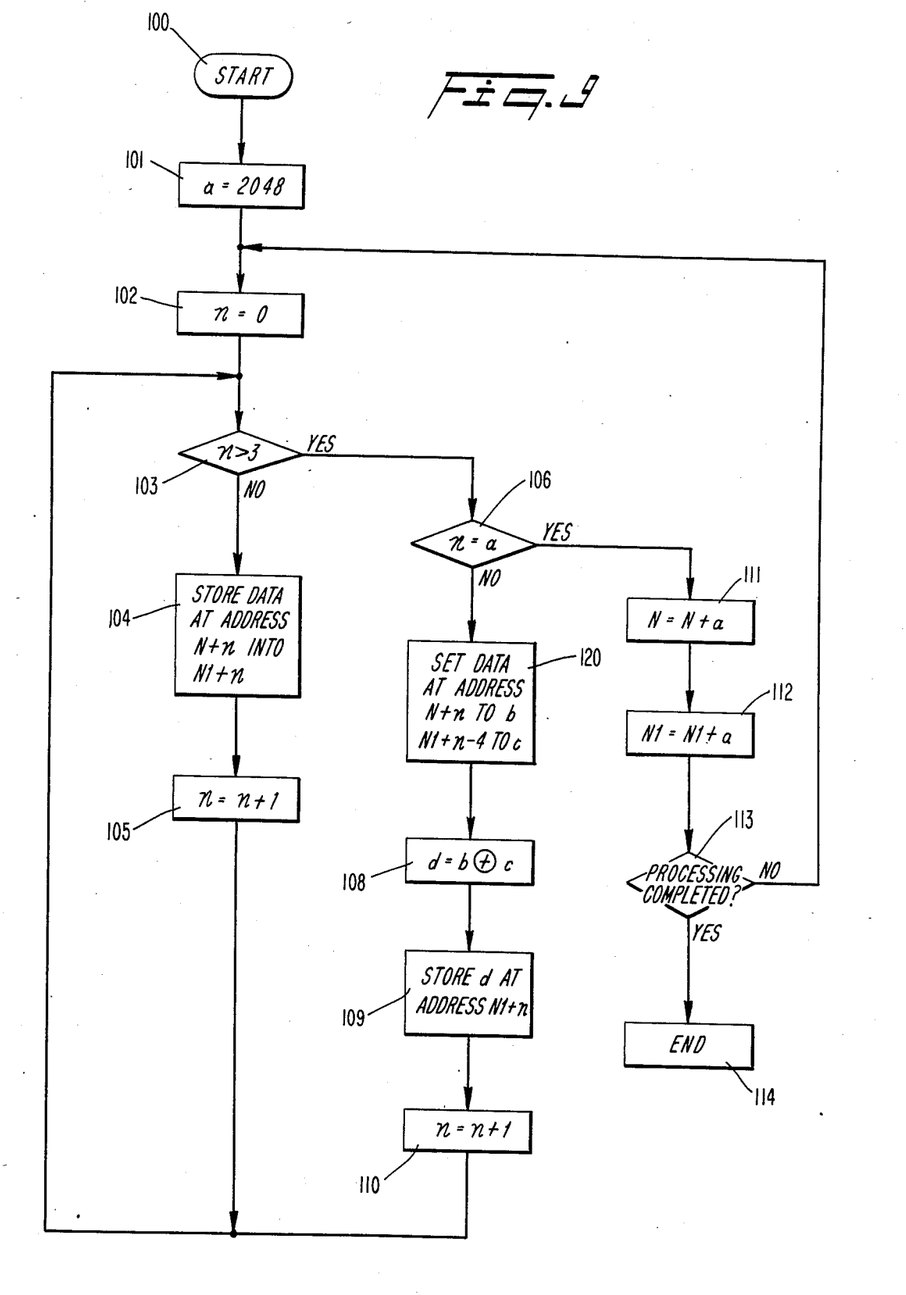
FIG. 9 is a flow chart showing another construction of the correlation processing circuit on the receiving side shown in FIG. 4.

FIG. 9 is a flow chart showing the processings executed by the correlation processing circuit on the receiving side shown in FIG. 4. In this case, the correlation processing on the receiving side is performed by subjecting the contents of respective addresses of the input buffer memory device, not shown, are subjecred to a suitable arithmetical operations, and by storing the results of these operations in corresponding addresses of the output buffer memory devices. The input buffer memory device is set to start with an address N, while the output buffer memory device is set to start with an address N1. In the same manner as in FIG. 8, respective addresses of the input and output buffer memory devices correspond to the bits of respective picture elements.

The flow chart shown in FIG. 9 is similar to that shown in FIG. 8 except that step 107 shown in FIG. 8 is replaced by step 120, in which the same reference numerals are used as those in FIG. 8 for the same steps. More particularly, at step 103 when it is judged that n>3, the processing is branched to step 106 at which a judgment is made as to whether n=a or not. When the result of this judgment is NO, that is the processing of a given line is not yet finished then, at step 120, the data at the (N+n)th address of the input buffer memory device is set to b and the data at the (N+n−4)th address (that is, the data of the output buffer memory device four elements before the data at the (N+n)th address of the input memory device) is set to c. Then at step 108, the exclusive logic sum of data b and c is calculated to obtain data d which is stored in the (N1+n)th address of the output buffer memory device at step 109. Then at step 110, n is incremented by 1 and the processing is returned to step 103.

Figure 10:
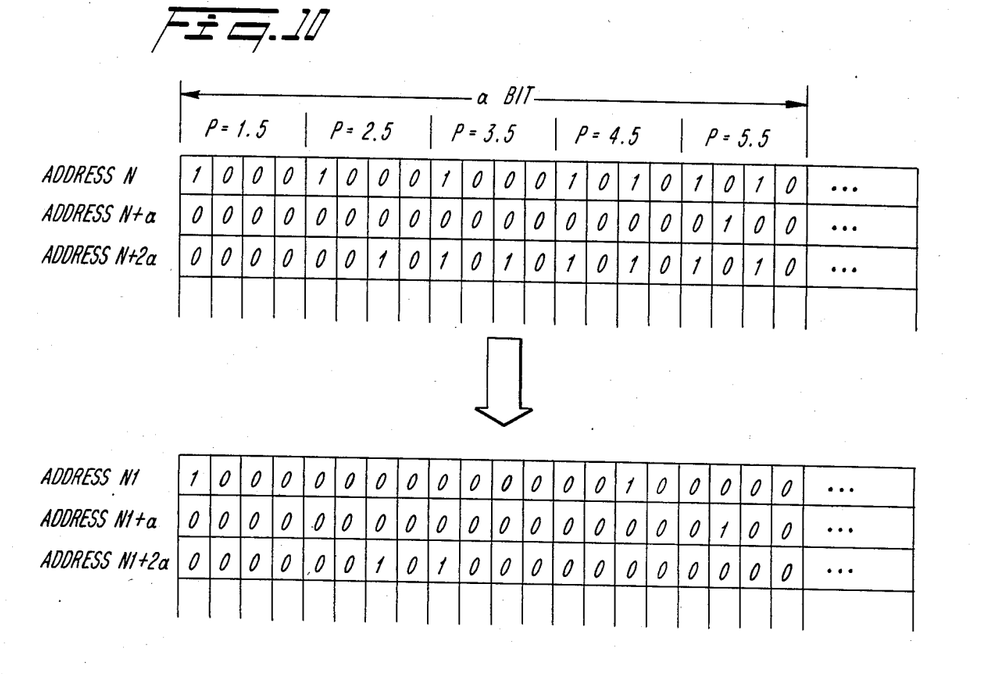
FIG. 10 is a table for explaining the correlation processing on the transmission side shown in FIG. 8.
Figure 11:
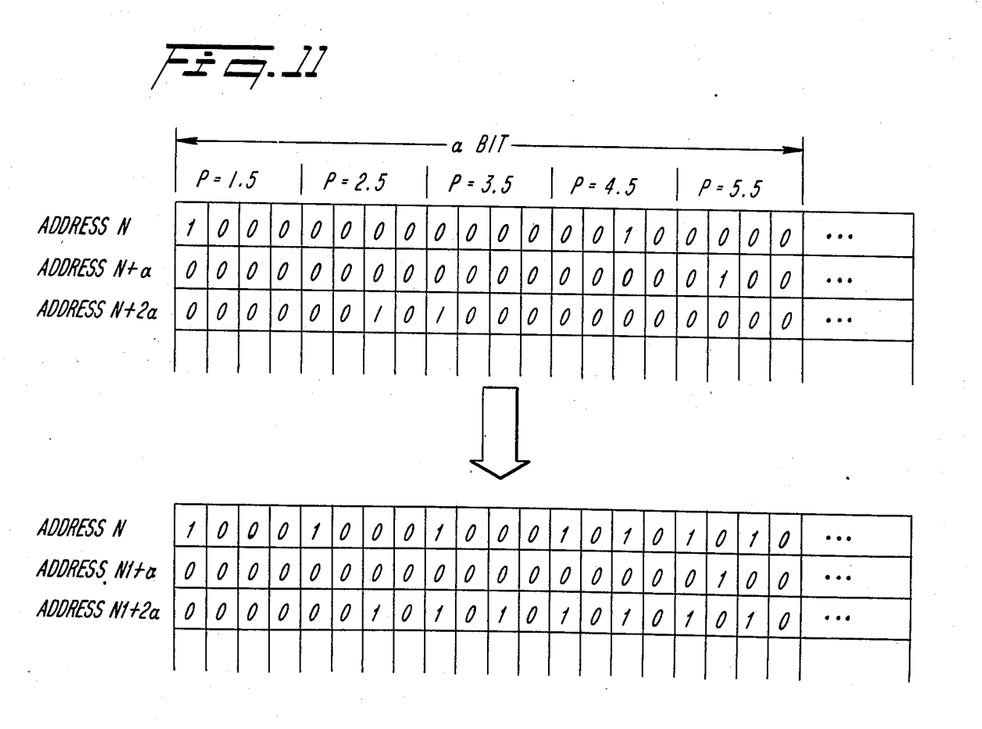
FIG. 11 is a table for explaining the correlation processing on the receiving side shown in FIG. 9.

When the pattern shown in FIG. 5, for example, is processed according to the flow charts shown in FIGS. 8 and 9, the results as shown in FIGS. 10 and 11 can be obtained in which tables shown in the upper portion show the content of the input buffer memory device, while the lower tables show the content of the output buffer memory device.

It should be understood that the invention is not limited to the foregoing embodiments. For example, the construction of the correlation circuit, numbers of M and N of the matrix, etc. can be variously modified without departing from the true spirit and scope of the invention as defined in the appending claims.

Furthermore, in the above described embodiment, although the signal change information was obtained by determining the correlation between corresponding picture elements in the picture information blocks which are continuously arrayed in the direction of the main scanning when the picture information is temporarily stored in memory means, the signal change information can be obtained by determining the correlation between corresponding picture element in picture information blocks which are continuously arrayed in the direction of the auxiliary scanning.

What is claimed is:

1. An encoding and transmitting apparatus for half tone picture information comprising:
    dither processing means for sequentially dither processing an analog picture image signal into a plurality of information blocks consisting of binary information binarized by means of a dither matrix including plural threshold values;
    correlation processing means for comparing corresponding binary information between neighboring information blocks dither processed by said dither processing means to output information when the corresponding binary information between said neighboring information blocks does not coincide with each other; and
    encoding means for encoding the signal change information outputted from said correlation processing means and transmitting the change signal information thus encoded.

2. The apparatus according to claim 1 wherein said encoding means effects encoding of signal change information outputted from said correlation processing means according to a Modified Huffman system.

3. The apparatus according to claim 1 wherein said encoding means effects encoding of signal change information outputted from said correlation processing means according to a Modified Read system.

4. The apparatus according to claim 1 wherein said encoding means effects encoding of signal change information outputted from said correlation processing means according to a Modified Modified Read system.

5. The apparatus according to claim 1 wherein said dither processing means effects dither processing of an inputted analog picture image signal into M×N binary information corresponding to M picture element points×N scanning points by means of a dither matrix including M×N threshold values.

6. The apparatus according to claim 5 wherein said correlation processing means comprises delay means for delaying inputted binary information supplied as a line information from said dither processing means by M picture elements thereby outputting the delayed binary information, and coincidence detecting means for detecting coincidence between binary information outputted from said delay means and binary information outputted from said dither processing means to output the results of the detection as said signal change information.

7. The apparatus according to claim 1 wherein said delay means comprises a shift register having at least M stages, said shift register being serially supplied with binary information dither processed by said dither processing means and outputting shifted information from the Mth stage of said shift register.

8. The apparatus according to claim 6 wherein said coincidence detecting means comprises an exclusive logic sum circuit performing exclusive logic summation between binary information outputted from said delay means and binary information dither processed by said dither processing means.

9. The apparatus according to claim 5 wherein said correlation processing means comprises inhibiting means for inhibiting output of said delay means by M picture elements at the beginning of each line.

10. Encoding and transmitting apparatus for half tone picture information comprising:
dither processing means for sequentially dither processing an analog picture image signal into a plurality of information blocks consisting of binary information binarized by means of a dither matrix including plural threshold values;
first correlation processing means for performing correlation between neighboring information blocks dither processed by said dither processing means to output signal change information corresponding to the difference between binary information of neighboring blocks;
encoding means for encoding the signal change information outputted from said first correlation processing means and transmitting the signal change information thus encoded;
said dither processing means, first correlation processing means and encoding means being installed on a transmission side;
decoding means for decoding the signal received from said encoding means; and
second correlation processing means for correlating the signals decoded by said decoding means between corresponding blocks to reproduce the original binary information dither processed by the dither matrix;
said decoding means and second correlating means being installed on a receiving side.

11. The apparatus according to claim 10 wherein said encoding means effects encoding of signal change information outputted from said first correlation processing means according to a Modified Huffman system.

12. The apparatus according to claim 10 wherein said encoding means effects encoding of signal change information outputted from the first correlation processing means according to a Modified Read system.

13. The apparatus according to claim 10 wherein said encoding means effects encoding of signal change information outputted from the first correlation processing means according to a Modified Modified Read system.

14. The apparatus according to claim 10 wherein said dither processing means effects dither processing of an inputted analog picture image signal into M×N binary information corresponding to M picture element points×N scanning points by means of a dither matrix including M×N threshold values.

15. The apparatus according to claim 14 wherein said first correlation processing means comprises first delay means for delaying inputted binary information supplied from said dither processing means by M picture elements to output the delayed binary information, and first coincidence detecting means for detecting coincidence between binary information outputted from said first delay means and binary information outputted from said dither processing means to output the results of the detection as said signal change information.

16. The apparatus according to claim 15 wherein said first delay means comprises a first shift register having at least M stages, said first shift register being serially supplied with binary information dither processed by said dither processing means and outputting from the Mth stage of said first shift register.

17. The apparatus according to claim 15 wherein said first coincidence detecting means comprises first exclusive logic sum circuit for performing exclusive logic summation between binary information outputted from said first delay means and binary information dither processed by said dither processing means.

18. The apparatus according to claim 14 wherein the first correlation processing means comprises first inhibiting means for inhibiting output of said first delay means by M picture elements at the beginning of each line.

19. The apparatus according to claim 14 wherein the second correlation processing means comprises second delay means for delaying the input signal to said second delay means by M picture elements, and second coincidence detecting means for detecting coincidence between an output of said second delay means and an output of said decoding means and for adding the results of the detection to the input of said second delay means to reproduce the original binary information dither processed by said dither matrix based on an output of said second coincidence detecting means.

20. The apparatus according to claim 19 wherein said second delay means comprises a second shift register having at least M stages, said second shift register being serially supplied with binary information from said decoding means and outputting shifted information from the Mth stage of said second shift register.

21. The apparatus according to claim 19 wherein said second coincidence detecting means comprises a second exclusive logic sum circuit for performing exclusive logic summation between an output of said second delay means and an output of said decoding means.

22. The apparatus according to claim 14 wherein the second correlation processing means comprises second inhibiting means for inhibiting output of said second delay means M picture elements at the beginning of each line.

23. A method of encoding and transmitting half tone image information comprising the steps of:
dither processing an analog picture signal into a plurality of information blocks consisting of binary information by means of a dither matrix including plural threshold values;
correlating respective binary information between picture information blocks dither processed by said dither processing means to output signal change information of respective binary information regarding respective binary information blocks; and
encoding for encoding signal change information outputted from said correlating step.

24. The method according to claim 23 wherein said encoding step effects encoding of said signal change information outputted from said correlation processing step according to a Modified Huffman system.

25. The method according to claim 23 wherein said encoding step effects encoding of said signal change information outputted from said correlation processing step according to a Modified Read system.

26. The method according to claim 23 wherein said encoding step effects encoding of said signal change information outputted from said correlation processing step according to a Modified Modified Read System.

* * * * *